United States Patent [19]
Chen

[11] Patent Number: 5,123,670
[45] Date of Patent: Jun. 23, 1992

[54] FOLDABLE STROLLER

[76] Inventor: Franys Chen, 9338 Charbola Rd., San Diego, Calif. 92129

[21] Appl. No.: 543,204

[22] Filed: Jun. 22, 1990

[51] Int. Cl.$^5$ .............................................. B62B 7/06
[52] U.S. Cl. ................................. 280/650; 280/658; 280/62; 280/47.38; 280/47.371; 296/97.21
[58] Field of Search ............... 280/62, 641, 642, 644, 280/647, 657, 658, 650, 655.1, 47.4, 47.38, 87.05, 250.1, 304.1; 296/97.21

[56] References Cited

U.S. PATENT DOCUMENTS

| | | | |
|---|---|---|---|
| D. 204,254 | 4/1966 | Cerf | D14/14 |
| D. 297,525 | 9/1988 | Baechler | D12/129 |
| 2,886,337 | 5/1959 | Quisenberry | 280/650 |
| 3,550,998 | 12/1970 | Boudreau et al. | 280/650 |
| 3,692,323 | 9/1972 | Sekine | 280/47.38 |
| 4,515,383 | 5/1985 | Minnebraker | 280/42 |
| 4,542,918 | 9/1985 | Singleton | 280/304.1 |
| 4,618,184 | 10/1986 | Harvey | 280/650 |
| 4,789,180 | 12/1988 | Bell | 280/47.371 |
| 4,795,186 | 1/1989 | Tyus | 280/655.1 |
| 4,848,780 | 7/1989 | Straub | 280/1.5 |
| 4,902,027 | 2/1990 | Skelly | 280/62 |
| 4,934,728 | 6/1990 | Chen | 280/650 |
| 4,953,880 | 9/1990 | Sudakoff et al. | 280/47.38 |
| 5,029,891 | 7/1991 | Jacobs | 280/47.38 |

FOREIGN PATENT DOCUMENTS

| | | | |
|---|---|---|---|
| 544406 | 1/1956 | Belgium | 280/62 |
| 2204282 | 11/1988 | United Kingdom . | |

Primary Examiner—David M. Mitchell
Attorney, Agent, or Firm—Richard L. Myers

[57] ABSTRACT

A stroller has a base frame which includes a front fork end connected to a front wheel and a rear end connected to two rear wheels. An elongated U-shaped tube member has its lower ends detachably connected to two sides of the base frame. A pair of rear support rods are pivoted to both the base frame and the U-shaped tube member. The stroller can be folded when the U-shaped tube member is detached from the base frame. The rear wheels can be detached from the base frame for convenient storage.

11 Claims, 6 Drawing Sheets

FOLDABLE STROLLER

BACKGROUND OF THE INVENTION

This invention relates to a three-wheeled stroller and particularly to a foldable three-wheeled stroller.

Foldable strollers with four wheels are known in the art. FIG. 1A and 1B show a foldable three-wheeled stroller which is disclosed in U.S. patent application Ser. No. 397,688 filed by the applicant of the present invention now U.S. Pat. No. 4,934,728. The stroller can be folded by turning the front fork member rearward to place the front wheel between the rear wheels. However, it has been found that the stroller is unsatisfactory because the size of the stroller does not decrease sufficiently when folded.

SUMMARY OF THE INVENTION

An object of the invention is to provide a stroller with an improved construction which can minimize the size of the folded stroller.

Another object of the invention is to provide a stroller with an improved construction which includes a a three-wheeled base frame on which is mounted a foldable elongated U-shaped tube and a pair of rear support tubes.

According to the present invention, a foldable stroller comprises: a base frame having a fork portion; a front wheel attached to the fork portion; two rear wheels detachably connected to the rear end of the base frame; first means for detachably connecting the rear wheels to the rear end of the base frame; an elongated U-shaped support tube having two arm tubes which have lower ends detachably connected to the sides of the base frame, the arm tubes being bent to incline rearward; a second means for detachably connecting the lower ends of the arm tubes to the base frame; a pair of rear support tubes having lower ends pivotally connected to the sides of the base frame, said rear support tubes having upper portions bent forward and pivotally connected to the arm tubes of the U-shaped support tube, the rear support tubes further having a transverse connecting rod member extending therebetween; and a seat assembly mounted on the U-shaped support tube.

The present exemplary preferred embodiment will be described in detail with reference to the accompanying drawings, in which:

DETAILED DESCRIPTION OF THE PREFERRED EMBODIMENT

Figure 1A:
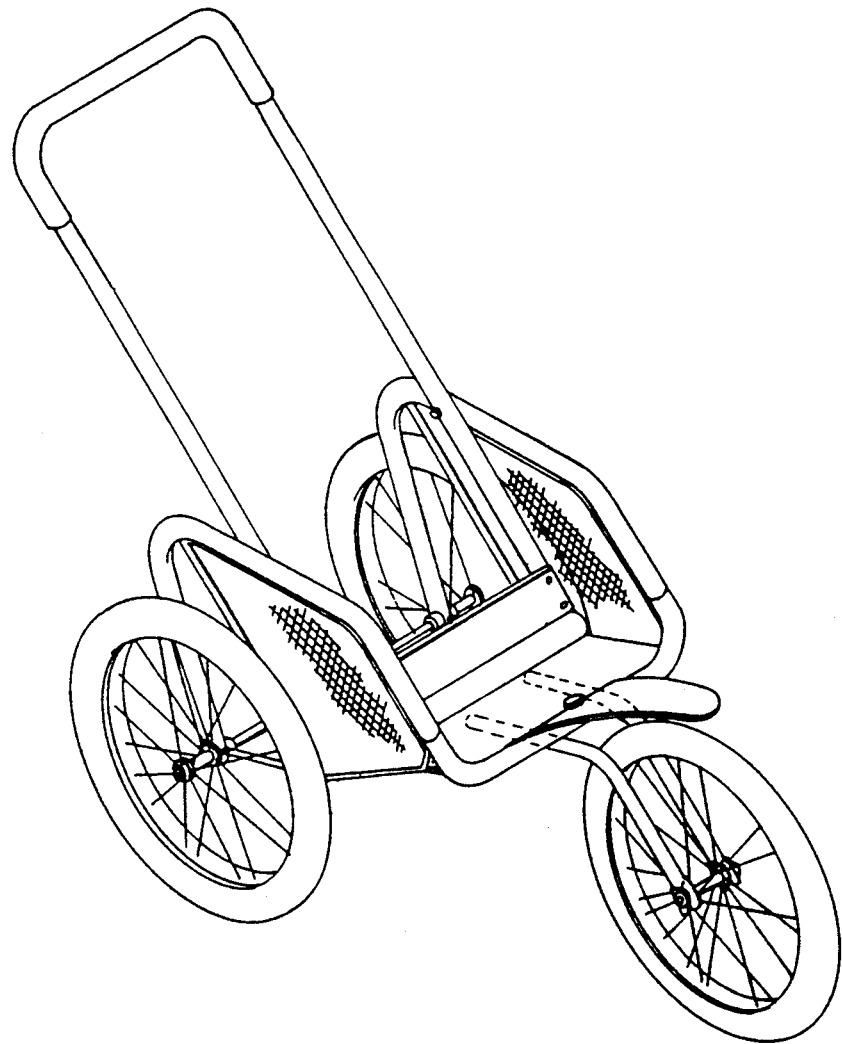
FIGS. 1A and 1B show a foldable stroller known in the art.
Figure 1B:
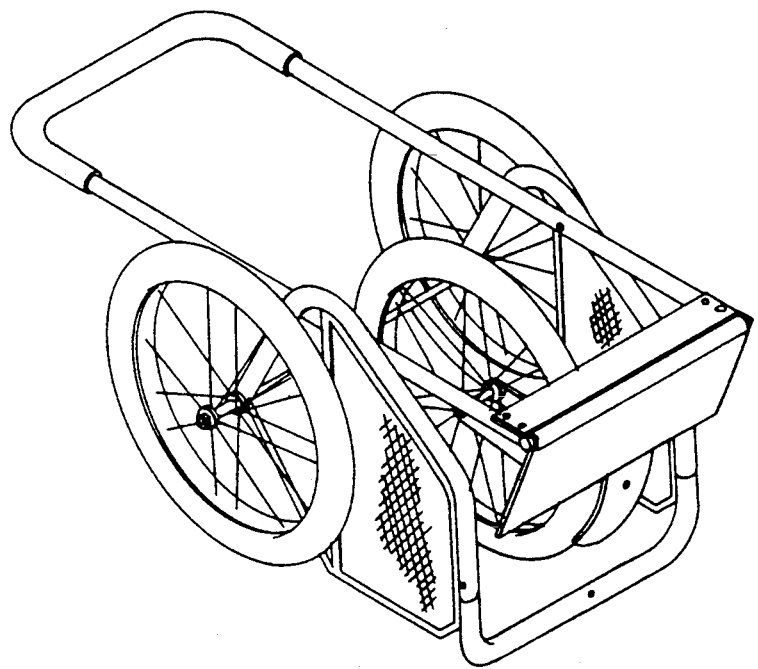
Figure 2:
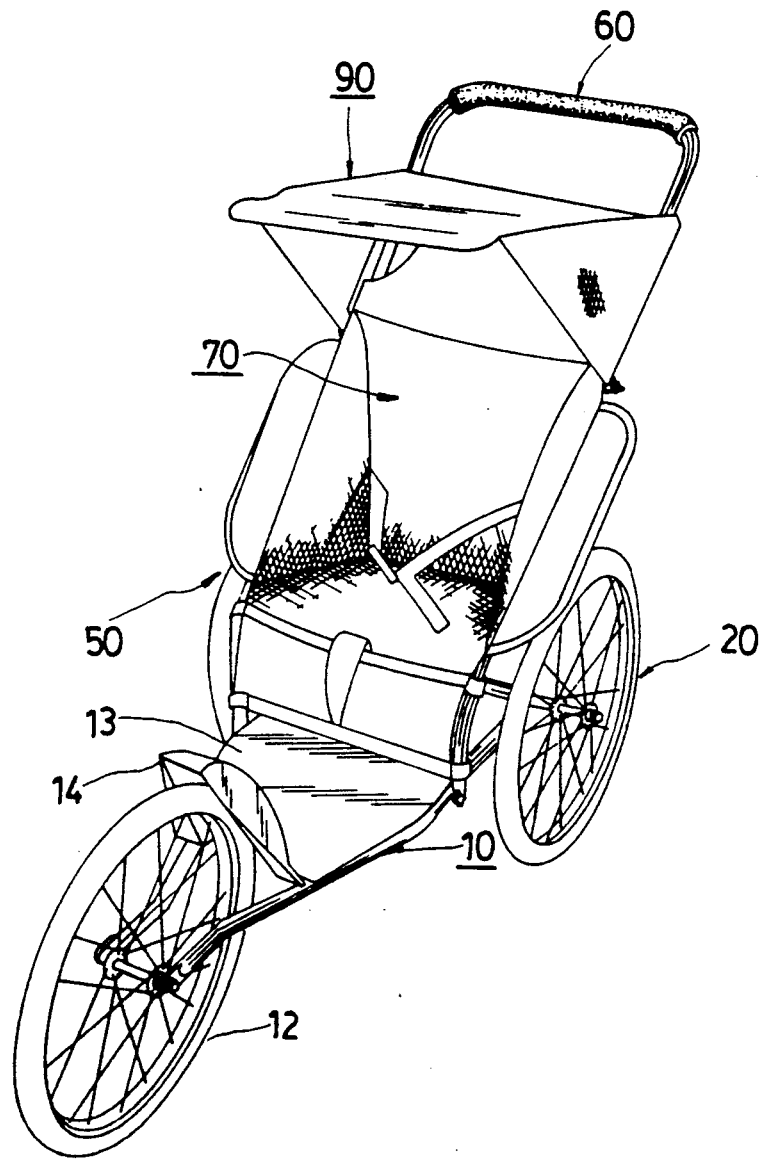
FIG. 2 is a perspective view of a stroller according to the present invention.
Figure 3:
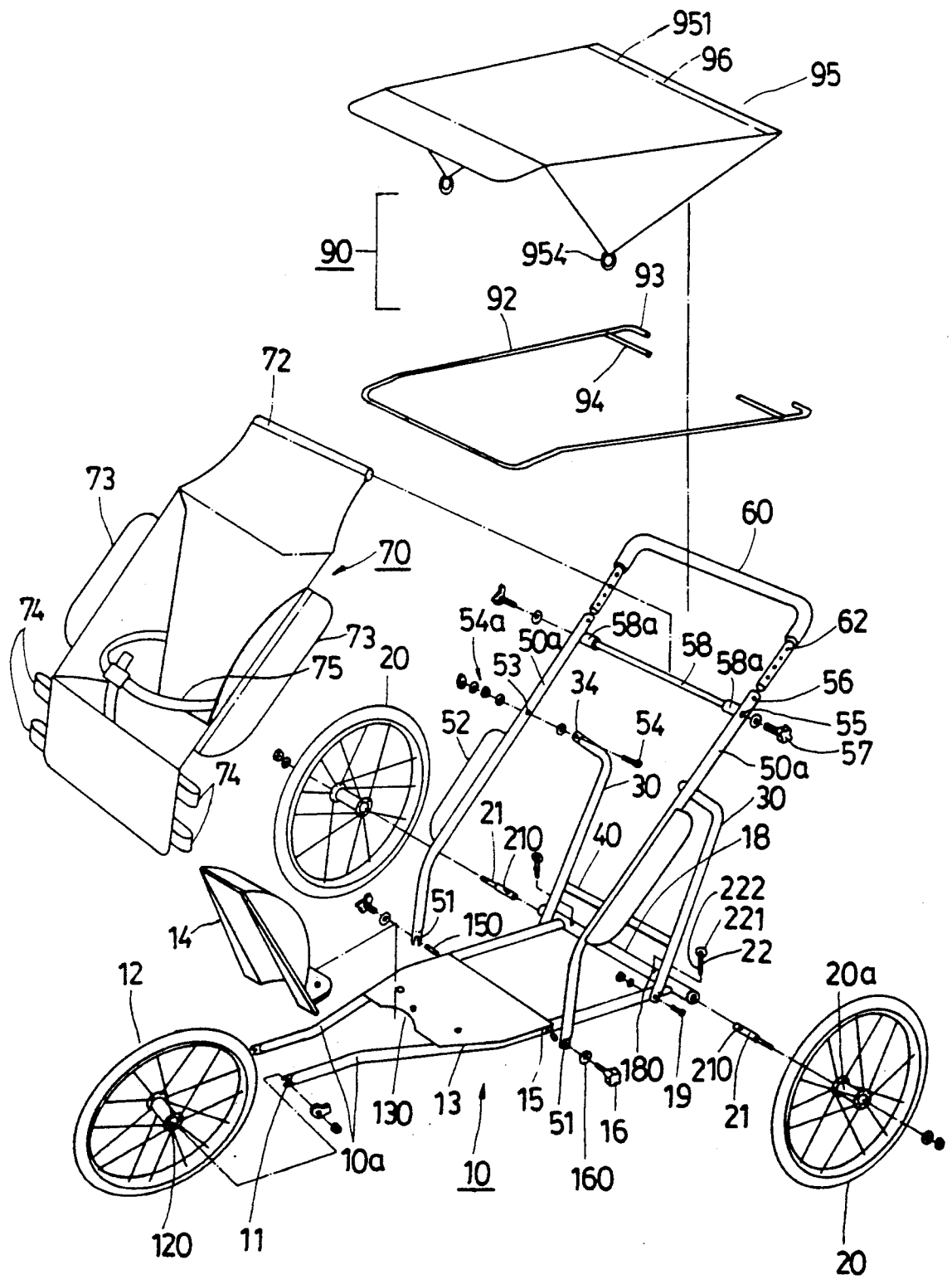
FIG. 3 is an exploded view of the stroller of FIG. 2.

Referring to FIGS. 2, and 3, a stroller incorporating the present invention includes a base frame 10, a front wheel 12, a footrest plate 13, a mudguard 14, two rear wheels 20, two rear support rods 30, a U-shaped front support tube 50, a seat assembly 70 and a canopy assembly 90.

The base frame 10 is elongated from the front end to the rear end thereof. The frame 10 is constituted of two tubes 10a which are bent at their front portions so that they converge forward and then constitute a fork-like part to hold the front wheel 12. Front ends 11 of the tubes 10a are forked and respectively fixed to two ends of a shaft 120 of the front wheel 12. A footrest plate 13 is welded to the tubes 10a. The front end of the footrest plate 13 has a curved notch 130 and is connected to a mudguard 14 near the notch 130. A transverse tube 18 is fixed to the rear ends of the tubes 10a to carry the rear wheels 20. Two holes 180 are provided in the tube 18 near the two ends thereof. A shaft pin 21 has a portion fixed in a hollow shaft of each wheel 20. Each wheel 20 is attached releasably to each end of the tube 18 by inserting the projecting portion of the shaft pin 21 into the tube 18 and fastening the same to the tube 18 by means of a detachable lock pin 22. The lock pin 22 has a pull ring 221 and a resilient projection 222, and is inserted into the tube 18 through the hole 180 of the tube 18 and the hole 210 of the shaft pin 21 until the pull ring 221 abuts the wall of the tube 18. The resilient projection 222 prevents the lock pin 22 from moving out of the tube 18. The pull ring 221 is used to pull out the lock pin 22 from the tube 18.

The two rear support rods 30 are interconnected by a transverse rod 40. Each rear support rod 30 has an L-shape. The lower end of each rod 30 is movably attached to each tube 10a with a screw 19. The top end of each rod 30 extends forward and is movably fastened to each arm tube 50a of the U-shaped support rod 50 by means of a screw assembly 54 which permits movement of the arm tube 50a and the rod 30.

The arm tubes 50a are bent at their lower sides and the lower ends 51 thereof are forked and detachably connected to the tubes 10a. The detachable connection is accomplished by using internally threaded hollow members 150 which are inserted in and welded to the tubes 18 to receive headed screw members 16 which screw the lower ends of the arm tubes 50a to the tubes 18. The headed screw members 16 can be easily detached from the threaded tubes 150. The upper portion of the U-shaped tube 50 is separable from the arm tubes 50a and serves as a handle 60. The handle 60 is telescopically connected to the arm tubes 50a and is provided with a plurality of adjustment holes 62. Holes 55 are provided in the arm tubes 50a in alignment with a black support rod 58. The height of the handle 60 can be adjusted by moving the handle 60 inward or outward from the arm tubes 50a, aligning one of the holes 62 with each hole 55 and then positioning the handle 60 with respect to the arm tubes 50a by using headed screw members 57. The back support rod 58 is attached to two hollow seats 58a of the arm tubes 50a which are in alignment with the holes 55. The screw members 57 which position the handle 60 extend into the hollow seats 58a to position the back support rod 58. Two arm-rest members 52 are attached to the arm tubes 50a.

The seat assembly 70 has a back whose top is provided with a sleeve 72 to be attached to the back support rod 58. The sleeve 72 can be detached from the back support rod 58 by detaching the screw members 57. The seat assembly 70 further has bottom fastening straps 74 to connect the bottom portion of the seat assembly 70 to the lower bent portions of the arm tubes 50a. A safety belt 75 is attached to the seat assembly 70. An accommodating bag 73 is provided at the back of the seat assembly 70.

The canopy assembly 90 has a canopy frame 92 whose ends 93 are attached to the arm tubes 50a at the holes 56. The assembly 90 also has a canopy 95 which is superimposed on the canopy frame 92 and whose rear end 951 is sleeved on a tube 96. The tube 96 is attached to two rod portions 94 of the canopy frame 92. Fastening rings 954 are attached to the canopy 95 to hook up the projecting heads of the screw members 54, thereby holding firmly the canopy 95 on the canopy frame 92.

Figure 4:
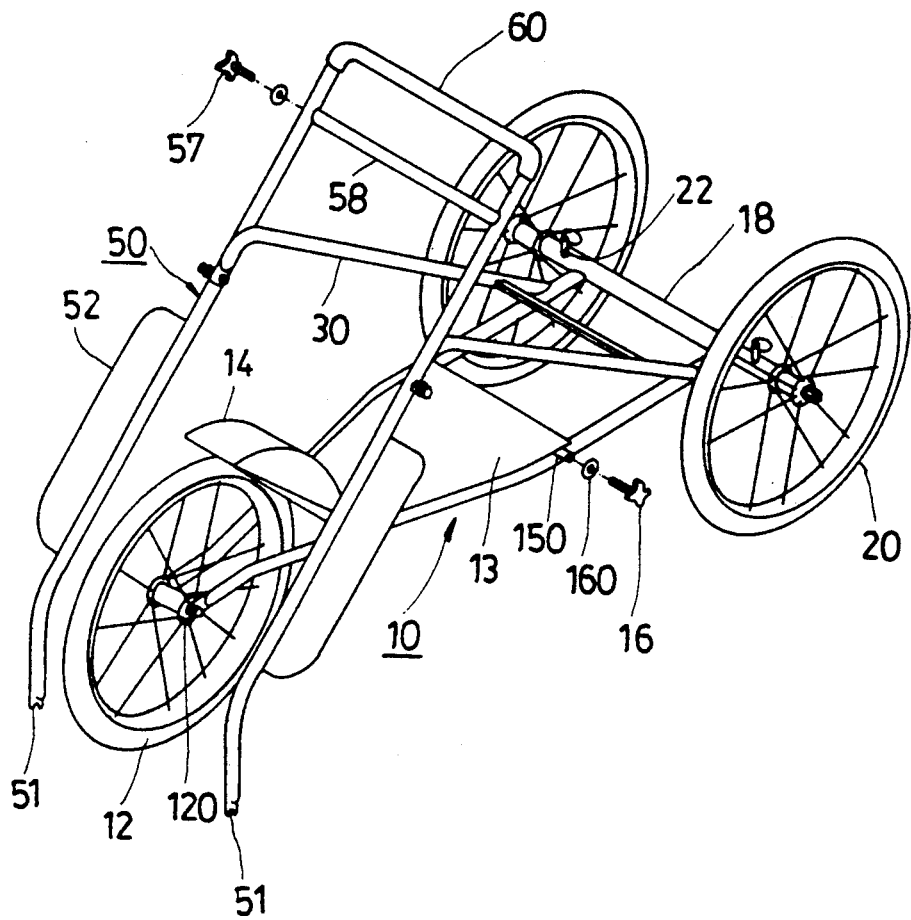
FIG. 4 is a perspective view of the stroller after being folded.
Figure 5:
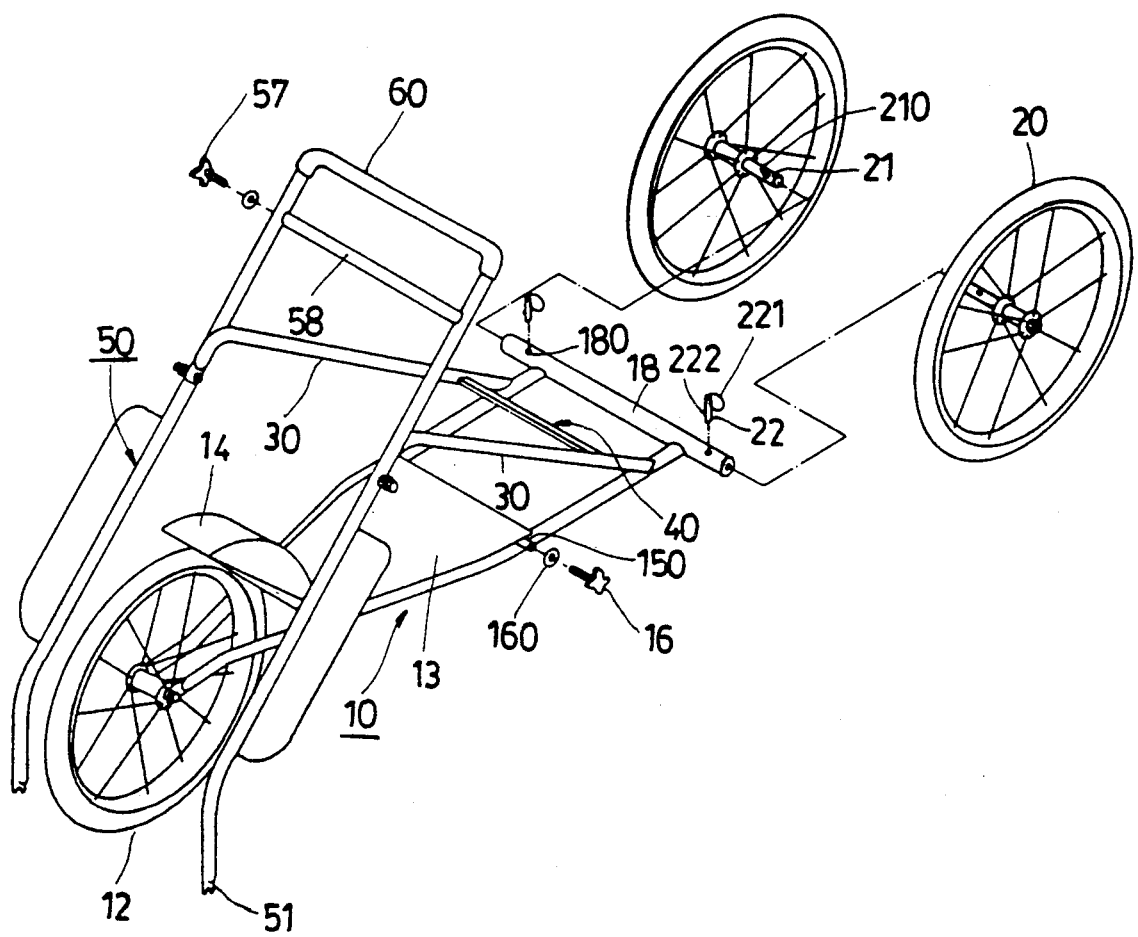
FIG. 5 is a perspective view of the stroller with the rear wheels being detached.

The stroller of the present invention can be folded easily as shown in FIGS. 4 and 5. First, the arm tubes 50a are detached from the tubes 10a by loosening the screws 16 and then pulling the tubes 10a forward, thereby also pulling the rear support rods 30 downward and forward. Afterward, the rear wheels 20 are detached from the rear transverse rod 18 by pulling the pull rings 221 of the lock pins 22 out from the rod 18. The stroller is thereby folded in a compact size that can be easily carried and stored. The user may carry the stroller in a small vehicle to a strolling place.

With the invention thus explained, it is apparent that numerous modifications and variations can be made without departing from the scope of the invention. It is therefore intended the invention be limited only as indicated in the appended claims.

I claim:

1. A foldable stroller, comprising:
    a base frame having a front end, a rear end, and two opposite sides between the front end and the rear end, the front end having a fork section;
    a pair of side tubes included in the base frame and having a substantially parallel configuration near the rear end of the base frame, the tubes of the base frame being bent to gradually approach one another and to form the fork section at the front end of the base frame;
    a footrest plate included in the base frame and connected to the tubes of the base frame between the rear end and the fork section of the base frame;
    a front wheel attached to the fork section of the base frame;
    two rear wheels each having a hollow shaft configured to be detachably connected to the rear end of the base frame;
    first means for detachably connecting the rear wheels to the rear end of the base frame;
    an elongated U-shaped support assembly having a pair of arm tubes with lower ends forked for detachable connection to the side tubes of the base frame, the arm tubes being bent to incline rearwardly of the base frame;
    second means for detachably connecting the lower ends of the arm tubes to the base frame;
    a transverse tube connected to the side tubes of the base frame;
    a shaft pin included in the first means and rotatably fitted in the hollow shaft of one of the rear wheels with a portion of the pin projecting out of the hollow shaft and defining a hole, the projecting portion being inserted in one end of the transverse tube;
    a lock pin removably inserted in the hole of the shaft pin through the transverse tube, the lock pin preventing the projecting portion of the pin from moving out of the transverse tube;
    an internally threaded hollow member included in the second means, fixed to each of the side tubes of the base frame, and having an outwardly protruding portion;
    a headed screw member included in the second means and passing through the forked lower end of one of the arm tubes, the screw member being threadedly inserted into the internally threaded hollow member of the second means;
    a pair of rear support tubes having lower ends removably connected to the sides of the base frame adjacent to the rear end, the rear support tubes having upper portions bent forward and pivotally connected to the arm tubes of the U-shaped support assembly;
    a transverse connecting rod extending between the rear support tubes; and
    a seat assembly mounted on the U-shaped support assembly.

2. The foldable stroller recited in claim 1 wherein the second means is operable to disconnect the lower ends of the arm tubes from the base frame to facilitate movement of the arm tubes forwardly and downwardly into a collapsed position over the base frame.

3. A foldable stroller as recited in claim 2 wherein operation of the second means permits the rear support tubes to be moved forwardly and downwardly into the collapsed position.

4. A stroller as claimed in claim 1 wherein the arm tubes are adapted to be detachably connected to the base frame where the two tubes of the base frame are substantially parallel.

5. A stroller as claimed in claim 1 wherein:
    the two tubes of the base frame form a parallel portion, a converging portion, and a fork portion; and
    the footrest plate extends at least partially across the parallel portion and the converging portion of the base frame.

6. A stroller as claimed in claim 5 wherein the two tubes of the base frame are substantially parallel in the parallel portion, are bent inwardly from the parallel portion to form the converging portion, and are bent outwardly from the converging portion to form the fork portion.

7. A foldable stroller, comprising:
    a base frame having a front end, a rear end, and two opposing sides extending between the front end and the rear end, the front end having a fork section;
    a front wheel attached to the fork section;
    two rear wheels configured to be detachably connected to the rear end of the base frame;
    first means for detachably connecting the rear wheels to the rear end of the base frame;
    an elongated U-shaped support assembly including two arm tubes each with a lower end detachably connected to one of the sides of the base frame, the arm tubes being bent to incline rearwardly of the base frame;
    portions of each of the arm tubes defining a particular hole;
    a U-shaped handle included in the U-shaped support assembly and having a pair of ends aligned to register with the arm tubes, each of the ends of the handle including portions defining a series of holes each alignable with the particular hole in a respective one of the arm tubes;
    a transverse rod extending between the arm tubes and having a pair of threaded ends;

a screw extending through one of the series of holes and the particular hole to register with one of the threaded ends of the transverse rod and maintain the handle at a desired height;

a pair of rear support tubes having lower ends removably connected to the sides of the base frame adjacent the rear end, the rear support tubes having upper portions bent forward and pivotally connected to the arm tubes of the U-shaped support assembly;

a transverse connecting rod extending between the rear support tubes; and a seat assembly mounted on the U-shaped support assembly.

8. The foldable stroller recited in claim 7 wherein the base frame includes two side tubes having a substantially parallel configuration near the rear end of the base frame, the side tubes being bent to gradually approach one another and to form the fork section at the front end of the base frame.

9. The foldable stroller recited in claim 8 wherein the base frame further comprises a footrest plate connected to the side tubes of the base frame between the rear end and the fork section of the base frame.

10. The foldable stroller recited in claim 7 further comprising means for disconnecting the lower ends of the arm tubes from the base frame to facilitate movement of the arm tubes forwardly and downwardly into a collapsed position over the base frame.

11. A foldable stroller as recited in claim 10 wherein operation of the disconnecting means permits the rear support tubes to be moved forwardly and downwardly into the collapsed position.

* * * * *